United States Patent [19]

Jannelli et al.

[11] Patent Number: 4,817,204
[45] Date of Patent: Mar. 28, 1989

[54] OPTICAL COMMUNICATION APPARATUS AND METHOD FOR TELEPHONE SUPERVISORY AND AUDIO SIGNALS

[75] Inventors: Ralph J. Jannelli; Larry W. Anderson, both of Charlotte, N.C.; Bruce E. Randall, Rock Hill, S.C.

[73] Assignee: Process Systems, Inc., Charlotte, N.C.

[21] Appl. No.: 8,488

[22] Filed: Jan. 29, 1987

[51] Int. Cl.[4] .............................................. H04B 9/00
[52] U.S. Cl. ..................................... 455/607; 379/379; 455/601; 455/612; 455/617
[58] Field of Search ............... 455/601, 606, 607, 602, 455/608, 612, 617; 379/379

[56] References Cited

U.S. PATENT DOCUMENTS

| | | | |
|---|---|---|---|
| 4,045,615 | 8/1977 | James et al. | 379/399 |
| 4,056,719 | 11/1977 | Waaben | 379/344 |
| 4,087,643 | 5/1978 | Joslow et al. | 370/54 |
| 4,449,247 | 5/1984 | Waschka | 455/608 |
| 4,475,011 | 10/1984 | Brightman et al. | 379/253 |
| 4,591,663 | 5/1986 | Sullivan | 455/602 |
| 4,601,064 | 7/1986 | Shipley | 455/608 |

OTHER PUBLICATIONS

Fiber Optic Phone System, Cord Electronics.

Primary Examiner—Robert L. Griffin
Assistant Examiner—Leslie Van Beek
Attorney, Agent, or Firm—Bell, Seltzer, Park & Gibson

[57] ABSTRACT

The invention is for an optical communication apparatus for bidirectionally transmitting and receiving supervisory and audio signals. The apparatus includes a telephone line interface unit that receives electric audio and supervisory signals and converts them to optical signals. It is also includes means for receiving optical signals representing audio and supervisory signals. A data unit receives the optical audio and supervisory signals from the interface unit and converts them to electric audio and supervisory signals, and also includes means for receiving electric audio signals and supervisory signals and converting them to corresponding optical signals. An optical link connects the telephone line interface unit and data unit for bidirectional optical communication. A method of practicing the invention is also included.

32 Claims, 2 Drawing Sheets

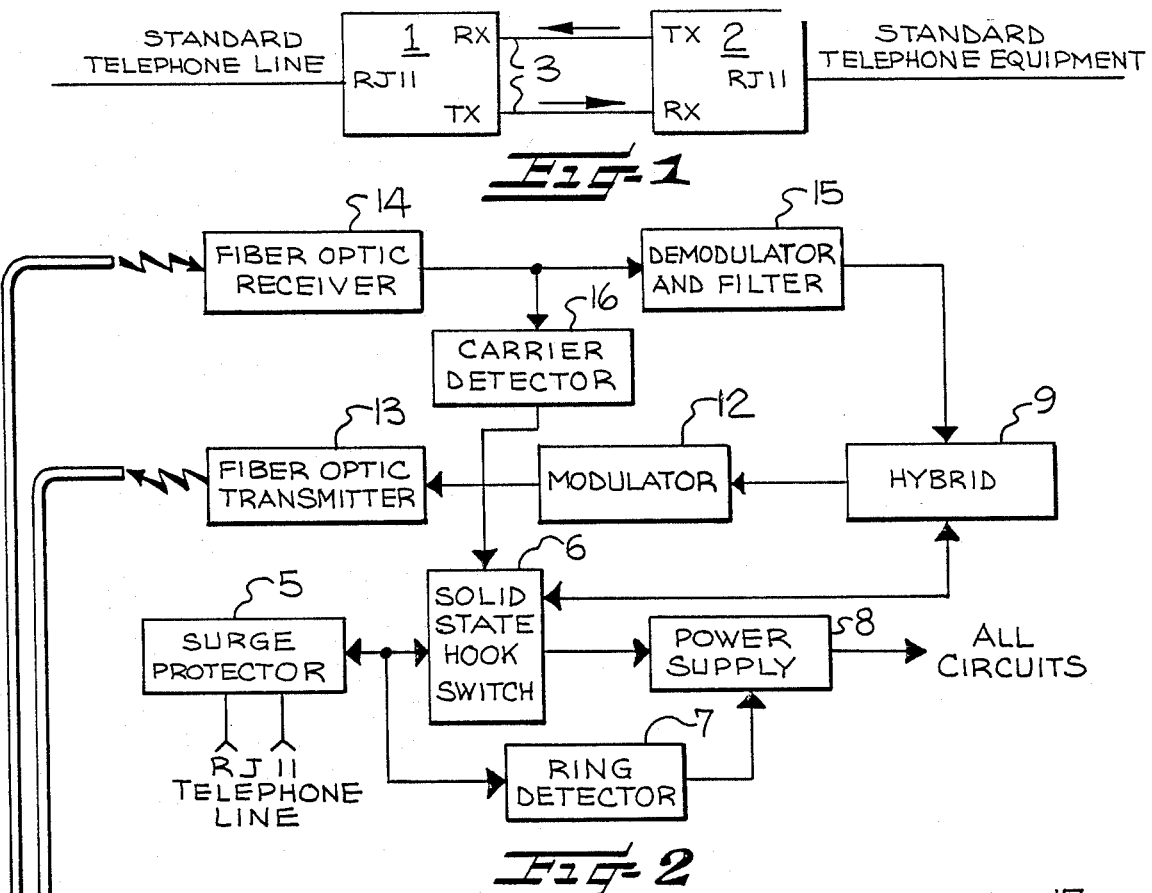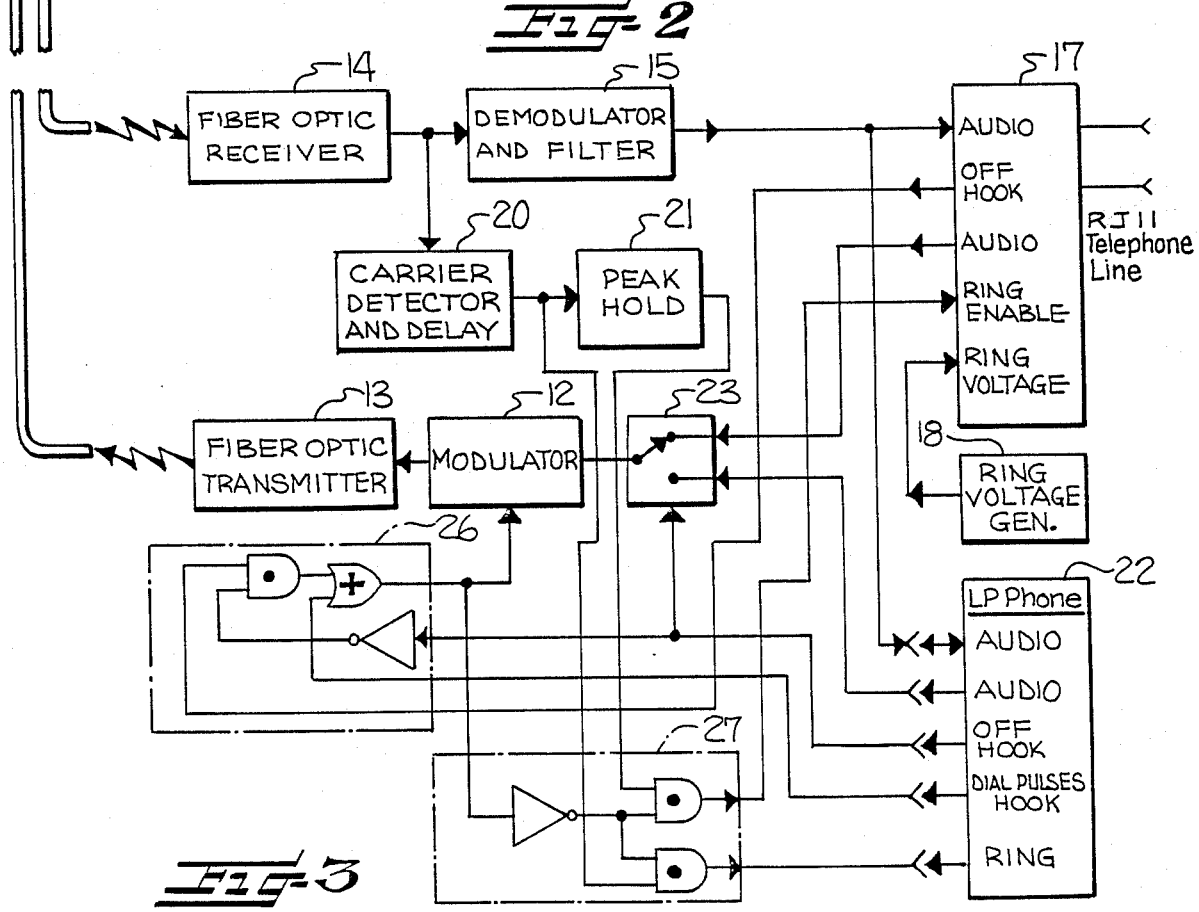

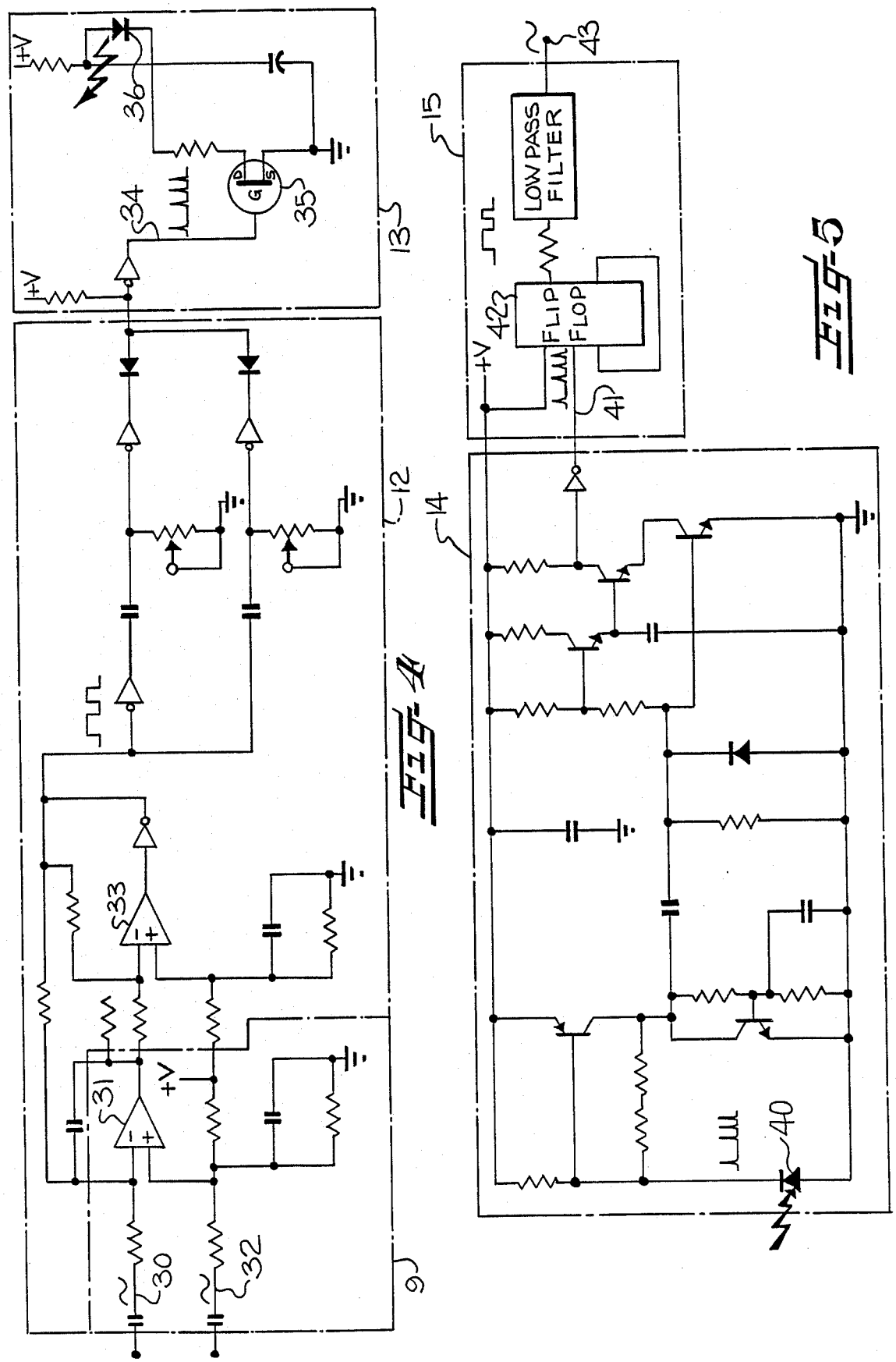

OPTICAL COMMUNICATION APPARATUS AND METHOD FOR TELEPHONE SUPERVISORY AND AUDIO SIGNALS

FIELD OF THE INVENTION

This invention relates to an optical communication apparatus and method compatible with standard telephone signals. More specifically, it relates to an optical link for bidirectionally transmitting and receiving standard telephone supervisory and audio signals on a real time basis. The optical link is transparent to the telephone system.

BACKGROUND OF THE INVENTION

Some industrial or commercial locations include conditions, or have the potential to generate conditions, that may be detrimental to a telephone system, low voltage network, or other signal or data communication network. By way of example, a telephone system transmits supervisory signals and analog audio signals which transmit the voice or voice band communications. The supervisory signals include an off-hook signal, indicating that the telephone unit is in use; a ring signal, which causes the bell to sound; and a dial pulse signal, which provides a string of pulses representing the dialed digits of the telephone number. The supervisory signals are low amperage and typically less than one hundred volts. The audio signals are an electric analog signal representing the speech energy generated by the user of the telephone. Alternatively, the audio signal may be voice band data communication, as generated by a modem unit. These communications are typically in the low frequency range of 300 – 3000 Hz and have a maximum amplitude of about 1 volt.

To prevent these sensitive communications from being disrupted, it is often necessary to isolate the telephone line from other electrical or electromagnetic influences. For example, ground potential rise can be caused in an electric power substation by an electrical system short or fault, or a lightening strike that passes a large surge of current to ground. This surge raises the voltage difference between the incoming telephone line ground and the substation earth ground, causing possible flash over, damage to telephone network equipment, and a compromise or loss of any supervisory or audio signals. In the past, isolation equipment has been used in an attempt to protect the telephone line, but the equipment is cumbersome, expensive, and has not been entirely successful, requiring expensive redundant systems or duplication of equipment.

Optical links have also been used in electrical systems to provide electrical isolation. Electrical signals are converted into optical signals and transmitted over fiber optic cable, which is a highly conductive optical link. Typical fiber optic cable has an electrical isolation exceeding one kilovolt per foot, yet its signal attenuation is less than 0.005 dB per meter, with a bandwidth exceeding 100 MHz. These qualities make fiber optic systems superior to traditional telephone isolation equipment because the only link is a cable having a high electrical impedance, yet it efficiently carries a clean signal in the voice band range.

Other fiber optic systems have been used to transmit telephone communications, but they are not compatible with standard telephone supervisory and audio signals, such as those available at an RJ11 or other approved telephone connection. Such systems do not communicate both supervisory and audio signals, they do not reconvert the fiber optic signals to a standard subscriber electrical interface, they are not powered by the telephone line, and do not transmit the signals on a real time basis over dedicated lines with optical signals that are truly representative of the corresponding electrical signals. Thus, these systems could not be freely substituted for standard telephone equipment. Some optical systems transmit analog signals, which results in a weak signal that is subject to attenuation and noisy transmission, as typified by low quality long distance communication. Optical transmission of analog data signals also suffers because the amplitude of the signal varies with the length of the connecting optical cable. Those optical systems utilizing digital transmission techniques are typically time division multiplexed systems, which are extremely complex and may use batch pulse transmission and high speed techniques. Such systems usually do not transmit supervisory signals. Still further, one cannot make a straight metallic-for-optic substitution in the communication link because the power normally transmitted over a metallic conductor is not transmitted by an optical cable.

Accordingly, it is an object of the present invention to provide an optical communication apparatus for bidirectionally transmitting and receiving telephone supervisory and audio signals.

It is a further object of the present invention to provide a transparent link for use in standard electric telephone lines, meaning that it is transparent to the user because it operates like a standard electric telephone line and transparent to the telephone company because it operates like a standard item of approved user telephone equipment.

It is a still further object of the present invention to provide an optical communication apparatus that may be installed as user telephone equipment.

It is a still further object of the present invention to provide an optical communication apparatus that transmits and receives supervisory and audio signals on a real time basis.

It is a still further object of the present invention to provide an optical communication apparatus that responds to telephone supervisory and audio signals moving in either direction.

It is a still further object of the present invention to provide an optical communication apparatus having a telephone line interface unit that is powered by the energy from a standard telephone line.

These and other objects of the present invention are provided by an optical communication apparatus for bidirectionally transmitting and receiving supervisory and audio signals. The apparatus includes a telephone line interface unit that receives electric audio and supervisory signals and converts them to optical signals. It is also includes means for receiving optical signals representing audio and supervisory signals. A data unit receives the optical audio and supervisory signals from the interface unit and converts them to electric audio and supervisory signals, and also includes means for receiving electric audio signals and supervisory signals and converting them to corresponding optical signals. An optical link connects the telephone line interface unit and data unit for bidirectional optical communication. A method of practicing the invention is also included.

DESCRIPTION OF THE DRAWINGS

FIG. 1 is a schematic block diagram illustrating a telephone line interface unit, optical link, and data unit of the present invention.

FIG. 2 is a schematic block diagram illustrating the telephone line interface unit of the present invention.

FIG. 3 is a schematic block diagram illustrating the data unit of the present invention.

FIG. 4 is an electrical schematic diagram illustrating the hybrid circuit, modulator and fiber optic transmitter for converting electric analog signals into electric digital signals, and electric digital signals to optical digital signals.

FIG. 5 is an electrical schematic diagram illustrating the fiber optic receiver for converting the digital optical signals into digital electric signals and the demodulator for converting the electric digital signals into electric analog signals.

DESCRIPTION OF THE INVENTION

While the invention will be described in connection with a preferred embodiment and method, it is to be understood that the invention is not limited to the specific embodiment disclosed. It is intended to cover all alternatives, modifications, and equivalents as would become apparent to one skilled in the art having the benefit of this description, and is within the scope and spirit of the invention as defined by the claims.

Referring to FIG. 1, the telephone line interface unit 1 is connected to the switched telephone network, a standard two wire electric telephone line, through an RJ11 connector. A voice/data unit 2 allows connection of registered or standard electric telephone user equipment through another RJ11 connector. A pair of fiber optic cables 3 provide an electrically non-conductive optical communication link between the interface unit and data unit. Each cable connects an optical transmitter TX in one unit to an optical receiver RX in the other unit. The interface unit 1 is powered directly from the telephone line, and the data unit is powered from an external source, such as a 120 volt outlet or batteries.

The line interface unit converts incoming electric voice band audio signals and supervisory signals to outgoing real time optical signals representing the received electric signals. It is powered by the telephone line itself within FCC registration requirements. The two fiber optic cables are connected thereto with commercially available connectors. If the system is being used in a power substation, the interface unit is installed outside the ground potential rise influence area.

The voice/data unit interfaces the standard electric telephone equipment, such as a communication instrument, modem, or recorder, to the fiber optic cables. It receives the incoming optical signals representing the audio signals and supervisory signals and converts them to outgoing real time electric voice band audio signals and supervisory signals. This unit may be installed inside the critical ground potential rise influence area of a power substation.

The fiber optic cable is a dual channel fiber optic cable. It transmits the optical pulses between the interface unit and data unit, providing the communication line therebetween.

Although the interface and data units are described above in connection with transmitting signals from the interface unit to the data unit, the invention is for bidirectional communication, as explained in more detail below.

FIG. 2 is a schematic block diagram for the interface unit 1. The standard telephone line is connected to the surge protector 5 through an RJ11 connector. The surge protector is conventional and protects the system from damaging surge voltages or currents. The received electric telephone signals are transmitted to the solid state hook switch 6 and ring detector 7. The solid state hook switch is conventional and controls whether the interface unit is on-hook or off-hook. Instead of RJ11, use approved connector in response to a signal from the carrier detector 16 reflecting that an optic carrier signal has been received by the interface unit. The ring detector is also conventional, except as noted below, and determines whether or not the incoming signal is a supervisory ring signal.

The hook switch and ring detector both include diode bridges that draw power from the telephone line. This energy is provided to the power supply 8, which provides the necessary energy to operate the circuitry in the line interface unit. The power supply may include a delay circuit, permitting it to settle before energy is drawn to power the interface unit.

The audio signal passed through the solid state hook switch 6 is transmitted to the hybrid circuit 9. The hybrid circuit, sometimes referred to as a duplex circuit, separates the incoming and outgoing electric audio signals. Since the telephone line is a bidirectional link, the hybrid circuit cancels out the mixing of audio signals to avoid a feedback path. As shown in FIG. 4, a portion of the outgoing electric audio signal from the solid state hook switch is phase shifted 180° and mixed with the incoming electric audio signal from the demodulator and filter, causing cancellation. This configuration is used in modems and other telephone equipment.

The modulator 12 receives the electric analog audio signal from the hybrid circuit 9 and converts it to a digital pulse width modulated signal. To lower power consumption, the pulse width modulated signal comprises narrow pulses of uniform width that are generated for each edge of each pulse of the pulse width modulated waveform. Each edge pulse may be, for example, 3 microseconds wide, and the modulator is typically a 25 KHz modulator, which provides a 3½KHz bandwidth. Thus, rather than sending the entire pulse width, only the edges are sent, resulting in a string of electrical rising/falling edge pulses. Using the rising-/falling pulse waveform reduces the duty cycle for the fiber optic transmitter to approximately 20%, where a full pulse width modulated signal has a duty cycle of approximately 50%. This reduces the power consumption for operation of the transmitter. The circuitry also responds better to a rising pulse than a falling pulse because of the absence of stored charge in the circuit. This provides a clearer signal, lowers power consumption because of the low and nearly constant duty cycle of the light pulse itself, eliminates the effects of pulse distortion that low power circuits may cause, and is compatible with circuits having a phase ambiguity because the recovered audio may be inverted as necessary.

The fiber optic transmitter 13 receives the electrical rising/falling edge pulse output from the modulator 12 and generates an optical pulse using a light emitting diode for each electrical pulse. The optical pulses are transferred via the fiber optic cable to the data unit 2.

The fiber optic receiver 14 in the interface unit receives light pulses from the data unit 2 and converts them to electrical pulses that correspond to the received optical pulses.

The carrier detector 16 responds to the presence of these electrical pulses to change the state of the solid state hook switch as necessary.

The demodulator and filter 15 also receives the electric rising/falling edge pulse signal from the fiber optic receiver 14. A bistable flip-flop in the demodulator is triggered by the pulses representing the rising and falling edges of the modulated pulse width, restoring the electric signal to its full pulse width modulation (PWM). This PWM signal is then filtered by an active low pass filter, providing to the hybrid circuit 9 an electric analog signal representing the transmitted audio.

FIG. 3 is a schematic block diagram illustrating the data unit. The modulator 12, fiber optic transmitter 13, fiber optic receiver 14, and demodulator and filter 15 operate as described in connection with FIG. 2.

The user end electric telephone line is connected to a commercially available interface device 17 (such as a Motorola MC 3419) having terminals for incoming and outgoing audio signals, and off-hook and ring enable supervisory signals. Another input connects the energy from a ring voltage generator 18 to the ringer on the device connected to the electric telephone line via the RJ11 connector. The output of the ring voltage generator may vary as necessary or desirable.

The carrier detector and delay 20, like the carrier detector 16, responds to the presence of an electric signal from the fiber optic receiver. The output signal from the carrier detector and delay indicates that an optical carrier has been received by the fiber optic receiver. The delay portion holds this signal for a predetermined period of time. The peak hold circuit 21 holds the peak voltage output from the carrier detector and delay for the logic circuit 27. Logic circuits 26, 27, described later, establish bidirectional communication between the interface unit and data unit.

A low power phone 22 may be used in combination with the interface 17 to provide an additional device for audio communication. Alternatively, it may be replaced by a modem or other standard telephone line user equipment.

A selector 23 receives control signal inputs from the off-hook terminal of the low power phone that cause it to switch between the audio output from the interface or the audio output from the low power phone.

FIG. 4 is a schematic diagram of the hybrid circuit 9, modulator 12 and fiber optic transmitter 13. The received electric audio signal, such as the incoming signal received at the solid state hook switch 6 (FIG. 2), is an analog signal supplied to line 30, which is connected to the inverting input of operational amplifier 31. An analog cancellation signal is supplied on line 32, which is connected to the positive input of operational amplifier 31. These two signals are summed by the operational amplifier. The resulting cancellation eliminates feedback resulting from a shared bidirectional audio line and isolates the audio signal to be transmitted. This electronically accomplishes what was conventionally done using a hybrid transformer. The remaining circuitry of the modulator is a square wave oscillator. The instantaneous value of the audio signal causes operational amplifier 31 to ramp at a rate proportional to the amplitude of the applied analog signal, and operational amplifier 33 provides a squared off PWM signal. The PWM output is converted by the succeeding logic circuitry to narrow pulses representing the rising and falling edges of the PWM signal.

These rising/falling edge pulses are provided on line 34 to the gate of field effect transistor 35, which energizes light emitting diode 36. The emitted pulses are transmitted over the fiber optic cable. The analog, pulse width modulated, and rising/falling edge pulses are illustrated adjacent the lines on which they are present in FIG. 4.

FIG. 5 is an electrical schematic and block diagram illustrating the fiber optic receiver 14 and demodulator and filter 15. The optic signals are received by the photodiode 40. These are the rising/falling edge pulses transmitted by the lighting emitting diode 36 and are represented in FIG. 5 adjacent the photodiode. These fiber optic transmitters and receivers have low power consumption which is within the minimum current draw permitted by the telephone company. The design illustrated operates at less than 8 microamps. This is accomplished using high beta transistors biased at very low levels, high resistance circuits to ensure a low current draw and a small capacitance to provide a turn on current. The rising/falling edge pulses from the fiber optic receiver are provided on line 41 to flip-flop 42, which essentially comprises the demodulator 15. The flip-flop toggles between high and low states upon receipt of the rising/falling edge pulses and provides a pulse width modulated signal output as illustrated. The pulse width modulated signal is provided to an active low pass filter of conventional design to provide an analog output on line 43.

In operation, with the standard telephone equipment at the data unit 2 being on-hook, an incoming electric ring supervisory signal is received at the surge protector 5 of the interface unit and detected by the ring detector 7 which uses the energy in the ring voltage to activate power supply 8. This developed power energizes the modulator 12 and fiber optic transmitter 13. The transmitted optical signals are rising/falling edge pulses typically representing a 50% duty cycle pulse width modulated signal, which in turn represents a ring supervisory signal. The fiber optic receiver 14 in the data unit receives the rising/falling edge pulse optical signal which causes the carrier detector and delay circuit 20 to output a signal to the peak hold circuit 21 and the logic circuitry 27. Assuming that the standard telephone equipment at the interface 17 is on-hook, the interface provides a signal to logic circuit 26, then to logic circuit 27, which combined with the signal from the carrier detector and delay and peak hold circuitry energizes the ring enable input of the interface 17. Thus, a standard telephone electric supervisory ring signal is transmitted to the user equipment.

The user equipment then goes off-hook, changing the state of the off-hook signal from the interface device 17 to the logic circuit 26, which disables the ring enable line via logic circuit 27 and energizes the modulator 12. The modulator causes the fiber optic transmitter in the data unit to transmit an optical equivalent of the electric off-hook supervisory signal, which is received by the fiber optic receiver 14 in the interface unit 1. The output of the fiber optic receiver in the interface unit is sensed by the carrier detector 16, which provides a signal to the solid state hook switch 6. This causes the interface unit to transmit an electric off-hook signal to the telephone line through the surge protector 5. The telephone company responds by removing the ring voltage from the telephone line at the surge protector 5 and connecting the audio path. The supervisory signals are essentially transmitted by sensing the presence or absence of the optical carrier signal, which also activates the transmitters and receivers in the interface and data units, establishing a bilateral communications link between the two.

The electric audio signals received over the telephone company line at the interface unit are passed through the surge protector 5 and solid state hook switch 6 to the hybrid circuit 9. The signals are there mixed with an inverted audio signal to cancel out any feedback, and then modulated and passed to the fiber optic transmitter 13 for transmission as optical pulses to the fiber optic receiver 14 in the data unit. The rising-/falling edge optical signals are received, converted into rising/falling edge electrical signals, and demodulated and filtered to convert them to an electric analog signal. The electric analog signal is provided to the audio input of the interface device 17 or low power phone 22.

Assuming that the user device connected to the interface 17 is in use, the selector switch 23 connects the modulator 12 to the audio output of interface device 17. The received electric audio signals are modulated to a rising/falling pulse signal and converted to optical rising/falling pulse signals by the fiber optic transmitter 13. These optical signals are received at the interface unit by the fiber optic receiver 14, converted to electrical rising/falling pulse signals, demodulated into a pulse width modulated signal and filtered to provide an analog audio signal. The analog audio signal is provided to the hybrid circuit 9, and cancelled as necessary with the inverted transmitted signal. The resulting audio signal passes through the solid state hook switch 6, through the surge protector 5, and onto the standard telephone line.

To terminate the telephone call, the user equipment at the data unit 2 is hung up, cancelling the off-hook signal from the interface unit 17. This disables, or turns off, the fiber optic transmitter 13. The carrier detector 16 in the interface unit 1 senses the absence of the optical carrier and changes state, causing the solid state hook switch 6 to go on-hook. This in turn disables the fiber optic transmitter in the interface unit 1, and the carrier detector and delay circuit in the data unit 2 likewise sense the absence of a carrier, completing the cycle.

Calls initiated by the user equipment at the data unit 2 cause the interface circuit 17 to go off-hook, enabling the logic circuits 26, 27. This turns on the fiber optic transmitter at the data unit, and the carrier detector 16 in the interface unit 1. The solid state hook switch 6 then goes off-hook, turning on the fiber optic transmitter 13 in the interface unit. The fiber optic receiver in the data unit detects the optical carrier signal but does not initiate a ring signal because the off-hook signal from the interface 17 inhibits the ring enable terminal via the logic circuit 27. The audio paths are now complete.

Touch tone dialing is done normally, with the audio signals transmitting the tones representing the selected digits. For pulse dialing the off-hook signals at the interface unit are rapidly switched on and off. The carrier detector and solid state hook switch 6 follow the alternating on and off hook pulses via the fiber optic link. A one-half second delay designed into the carrier detector and delay 20 prevents the ringer from being enabled during dial pulses and prevents a short ring when the phone is hung up. After pulse dialing, the carrier is still energized to carry the audio signal.

That which is claimed is:

1. An optical communication apparatus for bidirectionally transmitting and receiving telephone supervisory and audio signals, the apparatus comprising
   (a) a telephone line interface unit including means for receiving incoming electric voice band audio signals and supervisory signals and converting them to outgoing real time pulse width modulated optical signals representing the audio signals and supervisory signals, said means for receiving and converting comprising means for generating a first pulse representing the rising edge of a width modulated pulse and a second pulse representing the falling edge of a width modulated pulse wherein the time between the first and second pulse represents the width of said width modulated pulse, and means for receiving said pulse width modulated optical signals representing audio signals and supervisory signals and converting them to outgoing real time electric voice band audio signals and supervisory signals;
   (b) a data unit including means for receiving incoming electric voice band audio signals and supervisory signals and converting them to outgoing real time pulse width modulated optical signals representing the audio signals and supervisory signals, said means for receiving and converting comprising means for generating a first pulse representing the rising edge of a width modulated pulse and a second pulse representing the falling edge of a width modulated pulse wherein the time between the first and second pulse represents the modulated width of the audio pulse, and means for receiving said pulse width modulated optical signals representing audio signals and supervisory signals and converting them to outgoing real time electric voice band audio signals and supervisory signals; and
   (c) means for optically linking the line interface unit and data unit for bidirectional optical communication so that the optical communication apparatus is effectively transparent to a user of the telephone system.

2. The apparatus of claim 1 wherein the interface unit comprises means for drawing all necessary power from a telephone line.

3. The apparatus of claim 1 wherein the means in either unit for receiving electric signals and converting them to optical signals comprises means for receiving an electric supervisory signal and generating a corresponding optical carrier signal.

4. The apparatus of claim 3 wherein the means in either unit for receiving electric signals and converting them to optical signals comprises means for encoding the real time pulse width modulated optical signal representing an electric audio band signal onto the optical carrier signal.

5. The apparatus of claim 1 wherein the means in either unit for receiving electric signals and converting them to optical signals comprises means for receiving electric audio signals and supervisory signals and converting them both to pulse width modulated optical signals outgoing on the same single optical link.

6. The apparatus of claim 1 wherein the means in either unit for receiving optical signals and converting them to electric signals comprises means for receiving an optical carrier signal and generating an electric supervisory signal.

7. The apparatus of claim 1 wherein the means in either unit for receiving optical signals and converting them to electric signals comprises means for receiving a real time pulse width modulated optical signal and generating a standard telephone electric audio signal.

8. The apparatus of claim 1 wherein either unit further comprises means for initiating the generation of an optical carrier signal in response to an electric supervisory signal.

9. The apparatus of claim 1 wherein either unit further comprises means for initiating the generation of an optical carrier signal in response to at least an optical carrier signal from the other unit.

10. The apparatus of claim 1 wherein the means for optically linking comprises an optical link for transmitting and an optical link for receiving.

11. The apparatus of claim 1 wherein the means in either unit for receiving and converting electric signals comprises means for receiving electric supervisory signals representing ring, on hook and dial pulse signals.

12. An optical communication apparatus for bidirectionally transmitting and receiving telephone supervisory and audio signals, the apparatus comprising
  (a) means for generating a first optical carrier signal in response to at least one of a first electric supervisory signal and a second optical carrier signal;
  (b) means for optically receiving the first optical carrier signal and for generating an electric supervisory signal substantially identical to the first electric supervisory signal;
  (c) means for generating a second optical carrier signal in response to at least one of the first optical carrier signal and a second electric supervisory signal;
  (d) means for optically receiving the second optical carrier signal and for generating an electric supervisory signal substantially identical to the second electric supervisory signal;
  (e) means for real time pulse width modulation of the first optical carrier signal in response to a first electric audio signal;
  (f) means for generating an electric audio signal substantially identical to the first electric audio signal in response to the pulse width modulated first optical carrier signal;
  (g) means for real time pulse width modulation of the second optical carrier signal in response to a second electric audio signal; and
  (h) means for generating an electric audio signal substantially identical to the second electric audio signal in response to the pulse width modulated second optical carrier.

13. The apparatus of claim 12 wherein the means for generating a first optical signal, means for receiving the second optical signal, means for modulation of the first optical signal, and means for generating an electric audio signal in response to the modulated second optical signal together comprise a telephone line interface unit; and the means for receiving the first optical signal, means for generating a second optical signal, means for generating an electric audio signal in response to the modulated first optical signal, and means for modulation of the second optical signal together comprise an audio data unit.

14. The apparatus of claim 13 wherein the telephone line interface unit further comprises means for drawing all necessary power from a standard telephone line.

15. The apparatus of claim 12 wherein either of the means for generating an optical carrier signal further comprises means for generating an optical carrier signal and transmitting it over an optical link.

16. The apparatus of claim 12 wherein the apparatus further comprises means responsive to optical and electric supervisory signals representing ring, on hook, and dial pulse signals.

17. The apparatus of claim 12 wherein the means for generating a second optical carrier signal comprises means for generating a second optical carrier signal representing ring, on hook, and dial pulse signals.

18. The apparatus of claim 12 wherein the means for real time pulse width modulation comprises means for generating a first pulse representing the rising edge of a width modulated pulse and a second pulse representing the falling edge of the width modulated pulse, the time between the first and second pulses representing the modulated width of the audio signal.

19. The apparatus of claim 12 wherein the electric audio signal is an analog signal and the optical audio signal is a digital signal.

20. The apparatus of claim 12 further comprising means for summing one of the first and second electric audio signals with the inverse of the other of the first and second electric audio signals to separate the first and second audio signals.

21. The apparatus of claim 12 wherein either of the means for generating an optical carrier signal further comprises means for selectively interrupting and reinstating the carrier signal in response to electric pulses received from a pulse dialing circuit.

22. The apparatus of claim 12 wherein either of the means for pulse width modulation further comprises means for modulating the carrier signal in response to audio tones received from an audio tone dialing circuit.

23. A method for optically transmitting and receiving telephone supervisory and audio signals, the method comprising
  (a) generating a first optical carrier signal in response to receiving at least one of a first electric supervisory signal and a second optical carrier signal;
  (b) optically receiving the first optical carrier signal and generating an electric supervisory signal substantially identical to the first electric supervisory signal;
  (c) generating a second optical carrier signal in response to receiving at least one of the first optical carrier signal and a second electric supervisory signal;
  (d) optically receiving the second optical carrier signal and generating an electric supervisory signal substantially identical to the second electric supervisory signal;
  (e) real time pulse width modulating the first optical carrier signal in response to a first electric audio signal;
  (f) generating an electric audio signal substantially identical to the first electric audio signal in response to the pulse width modulated first optical carrier signal;
  (g) real time pulse width modulating the second optical carrier signal in response to a second electric audio signal; and (h) generating an electric audio signal substantially identical to the second electric audio signal in response to the pulse width modulated second optical carrier.

24. The method of claim 23 wherein the steps of generating a first optical signal, receiving the second optical signal, modulating the first optical signal, and generating an electric audio signal in response to the modulated second optical signal further comprise drawing all necessary power from a standard telephone line.

25. The method of claim 23 wherein either of the steps of generating an optical carrier signal further comprises generating an optical carrier signal and transmitting it over an optical link.

26. The method of claim 23 wherein the step of receiving optical carrier signals comprises receiving supervisory signals representing ring, on hook, and dial pulse signals.

27. The method of claim 23 wherein the step of generating a second optical carrier signal comprises generating a second optical carrier signal representing ring, on hook, and dial pulse signals.

28. The method of claim 23 wherein the step of real time pulse width modulating comprises generating a first pulse representing the rising edge of a width modulated pulse and a second pulse representing the falling edge of the width modulated pulse, the time between the first and second pulses representing the modulated width of the audio signal.

29. The method of claim 23 wherein the step of generating an electric audio signal comprises generating an analog signal, and the step of generating an optical audio signal comprises generating a digital signal.

30. The method of claim 23 further comprising separating the first and second audio signals by summing one of the first and second electric audio signals with the inverse of the other of the first and second electric audio signals.

31. The method of claim 23 wherein either of the steps of generating an optical carrier signal further comprises selectively interrupting and reinstating the carrier signal in response to electric pulses received from a pulse dialing circuit.

32. The method of claim 23 wherein either of the steps of pulse width modulating further comprises modulating the carrier signal in response to audio tones received from an audio tone dialing circuit.

* * * * *